United States Patent [19]

Lötsch

[11] Patent Number: 5,557,987
[45] Date of Patent: Sep. 24, 1996

[54] SHIFTING DEVICE FOR A TURNING GEAR TRANSMISSION WITH AUTOMATIC TRANSMISSION-RATIO CHANGE FOR A CHANGE IN DIRECTION OF A DRIVING SHAFT

[75] Inventor: Kurt Lötsch, Wiesental, Germany

[73] Assignee: Heidelberger Druckmaschinen AG, Heidelberg, Germany

[21] Appl. No.: 273,410

[22] Filed: Jul. 11, 1994

[30] Foreign Application Priority Data

Jul. 10, 1993 [DE] Germany ............... 43 23 114.4

[51] Int. Cl.⁶ ............................ F16H 3/08; F16D 13/10
[52] U.S. Cl. ............................ 74/810.1; 192/36
[58] Field of Search ........................ 74/810.1; 192/35, 192/36

[56] References Cited

U.S. PATENT DOCUMENTS

| | | | |
|---|---|---|---|
| 102,697 | 5/1870 | Morton | 74/810.1 X |
| 1,563,742 | 12/1925 | Hansen | 74/810.1 X |
| 2,903,901 | 9/1959 | MacDonald | 74/810.1 X |
| 4,352,979 | 10/1982 | Knecht | 74/810.1 X |

FOREIGN PATENT DOCUMENTS

| | | | |
|---|---|---|---|
| 2660040 | 9/1991 | France . | |
| 296507 | 9/1914 | Germany . | |
| 1500366 | 5/1970 | Germany . | |
| 270838 | 5/1970 | U.S.S.R. | 74/810.1 |
| 7681 | of 1913 | United Kingdom | 74/810.1 |
| 134199 | 8/1920 | United Kingdom . | |

Primary Examiner—Charles A. Marmor
Assistant Examiner—Nathan O. Jensen
Attorney, Agent, or Firm—Herbert L. Lerner; Laurence A. Greenberg

[57] ABSTRACT

Shifting device for a turning gear transmission having an automatic change of transmission ratio when a change in direction of a driving shaft occurs, including two driving gearwheels disposed coaxially with respect to the driving shaft, the driving gearwheels being of different diameters and, respectively, being disconnectable from the driving shaft, and a driven shaft having two driven gearwheels firmly connected thereto and being in continuous pair-wise engagement with the driving gearwheels, further includes a pawl holder rotatably mounted on the driving shaft, the driving gearwheels being rotatably mounted on the pawl holder, at least one pair of pawls held by the pawl holder, and a device for causing the pair of pawls, contingent upon the respective direction of rotation of the driving shaft, to effect an entrainment of one of the driving gearwheels in a different direction of rotation.

3 Claims, 3 Drawing Sheets

SHIFTING DEVICE FOR A TURNING GEAR TRANSMISSION WITH AUTOMATIC TRANSMISSION-RATIO CHANGE FOR A CHANGE IN DIRECTION OF A DRIVING SHAFT

DESCRIPTION

The invention relates to a shifting device for a turning gear transmission with an automatic transmission-ratio change for a change in direction of a driving shaft, the turning gear transmission having hand-operated or motor-driven turning gears, the transmission ratio of which changes whenever there is a change in the direction of rotation of the driving shaft.

Turning gear transmissions have become known heretofore, wherein at least two gearwheels of different diameter are disposed on a driving shaft and are enabled, by means of a shifting device, to be brought into pair-wise engagement with gearwheels on a driven Shaft or are in continuous engagement with gearwheels on a driven shaft and are disconnectable from the driving shaft. The shifting device for reversing the direction of rotation can be operated manually by hand or function automatically through signals originating from the gearwheel or from outside.

Such shifting devices are material- and cost-intensive and are too complicated to operate manually.

It is accordingly an object of the invention to provide a shifting apparatus for a turning gear, said shifting apparatus being of simple construction and permitting an automatic change of transmission ratio both in manual operation and also in motor-driven operation.

With the foregoing and other objects in view, there is provided, in accordance with the invention, a shifting device for a turning gear transmission having an automatic change of transmission ratio when a change in direction of a driving shaft occurs, including two driving gearwheels disposed coaxially with respect to the driving shaft, the driving gearwheels being of different diameters and, respectively, being disconnectable from the driving shaft, and a driven shaft having two driven gearwheels firmly connected thereto and being in continuous pair-wise engagement with the driving gearwheels, comprising a pawl holder rotatably mounted on the driving shaft, the driving gearwheels being rotatably mounted on the pawl holder, at least one pair of pawls held by the pawl holder, and means for causing the pair of pawls, contingent upon the respective direction of rotation of the driving shaft, to effect an entrainment of one of the driving gearwheels in a different direction of rotation.

Thus, in a shifting device for a turning gear transmission, a pawl holder is disposed on a driving shaft with two driving gearwheels of different diameter, the pawl holder being rotatably held. The gearwheels themselves are held on the pawl holder and are in continuous engagement with gearwheels of a driven shaft. Further provided according to the invention is at least one pair of pawls, which through rotation of the driving shaft, cause one of the driving gearwheels to be driven in a different direction.

With the rotation of the driving shaft in one direction, at least one pawl is brought into contact, frictionally or form-lockingly, with one of the driving gearwheels so that a torque is transferred from the driving shaft via the pawl to the driving gearwheel. The driving gearwheel transmits the torque to its co-engaging, driven gearwheel, so that a torque is available at the driven shaft. The second gearwheel mounted on the driving shaft and engaging with the second gearwheel of the driven shaft rotates freely on the pawl holder.

When the direction of rotation is reversed, the first pawl of the respective pair of pawls comes out of contact with the first driving gearwheel, and the second pawl enters into contact with the second driving gearwheel. The torque is transmitted in the same manner, the difference in the diameters of the gearwheels resulting, for an identical input speed at the driving shaft, in a different speed at the driven shaft than in the opposite direction of rotation.

In accordance with another feature of the invention, the pawl holder is connected to a pawl of a two way-acting friction-type restraining mechanism.

In accordance with a further feature of the invention, the friction-type restraining mechanism comprises a locally anchored spring, the spring being tautly laid in a partial region about an outside diameter of a shoulder formed on the pawl holder.

In accordance with an added feature of the invention, the friction-type restraining mechanism comprises brake shoes engageable with a friction surface of the pawl holder, and means for loading the brake shoes with spring force.

In accordance with an additional feature of the invention, the driving gearwheels have internal teeth forming, together with at least one of the pawls, a one way-acting, form-locking driving clutch.

In accordance with yet another feature of the invention, the shifting device includes four of the pawls swivellable pair-wise about a common axis disposed parallel to the rotational axis of the driving shaft, the pawls, respectively, being situated in recesses formed in the pawl holder and being displaceable therein with a radial component.

In accordance with a concomitant feature of the invention, the common axis is on a swivel pin fixed in a recess formed in the driving shaft.

Other features which are considered as characteristic for the invention are set forth in the appended claims.

Although the invention is illustrated and described herein as embodied in a shifting device for a turning gear transmission with an automatic transmission-ratio change for a change in direction of a driving shaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
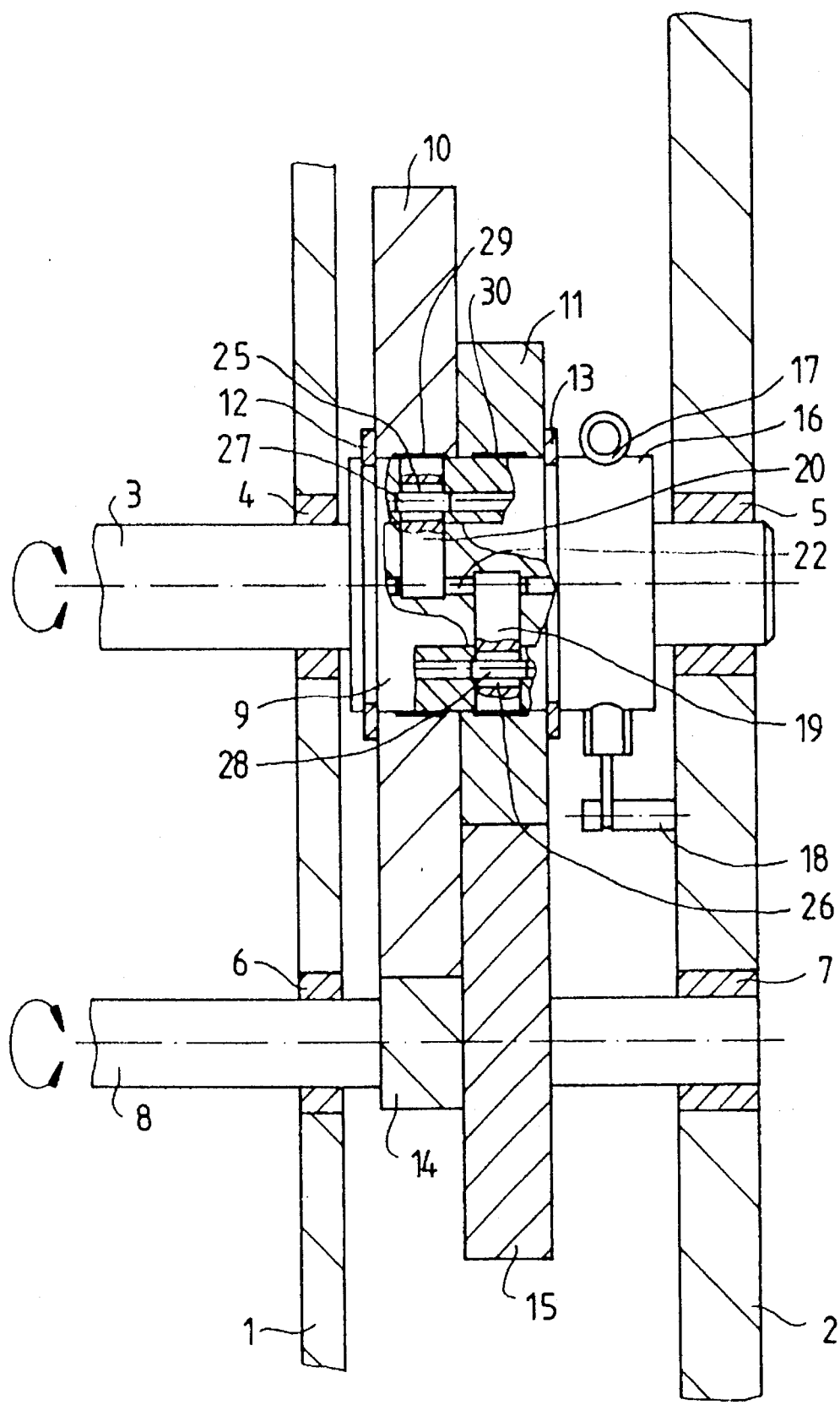
FIG. 1 is a cross-sectional view of a turning gear transmission.
Figure 2:
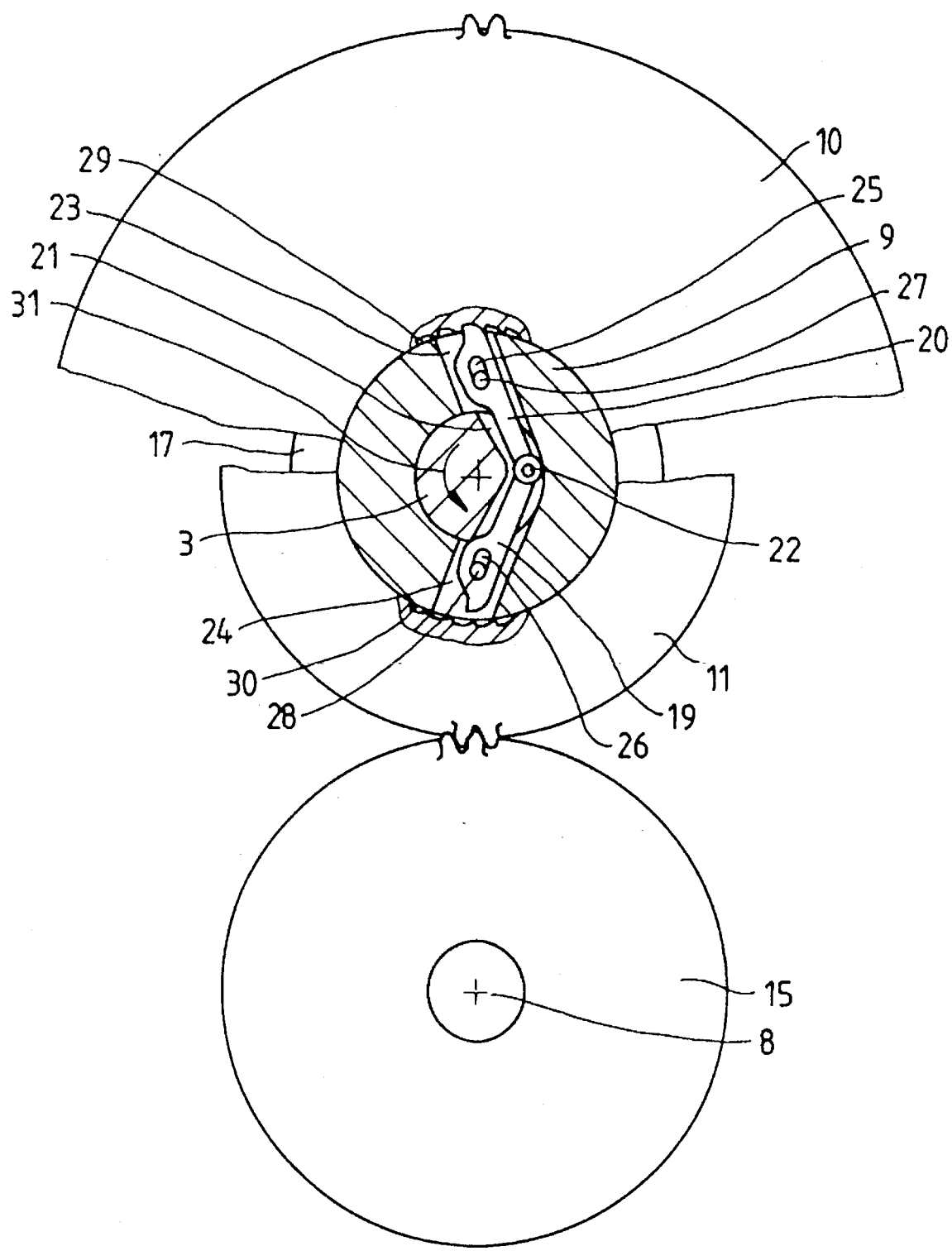
FIG. 2 is an elevational view, partly in section and broken away, as seen from the left-hand side of FIG. 1 of the turning gear transmission showing the operation of the shifting device therefor in a first direction of rotation.
Figure 3:
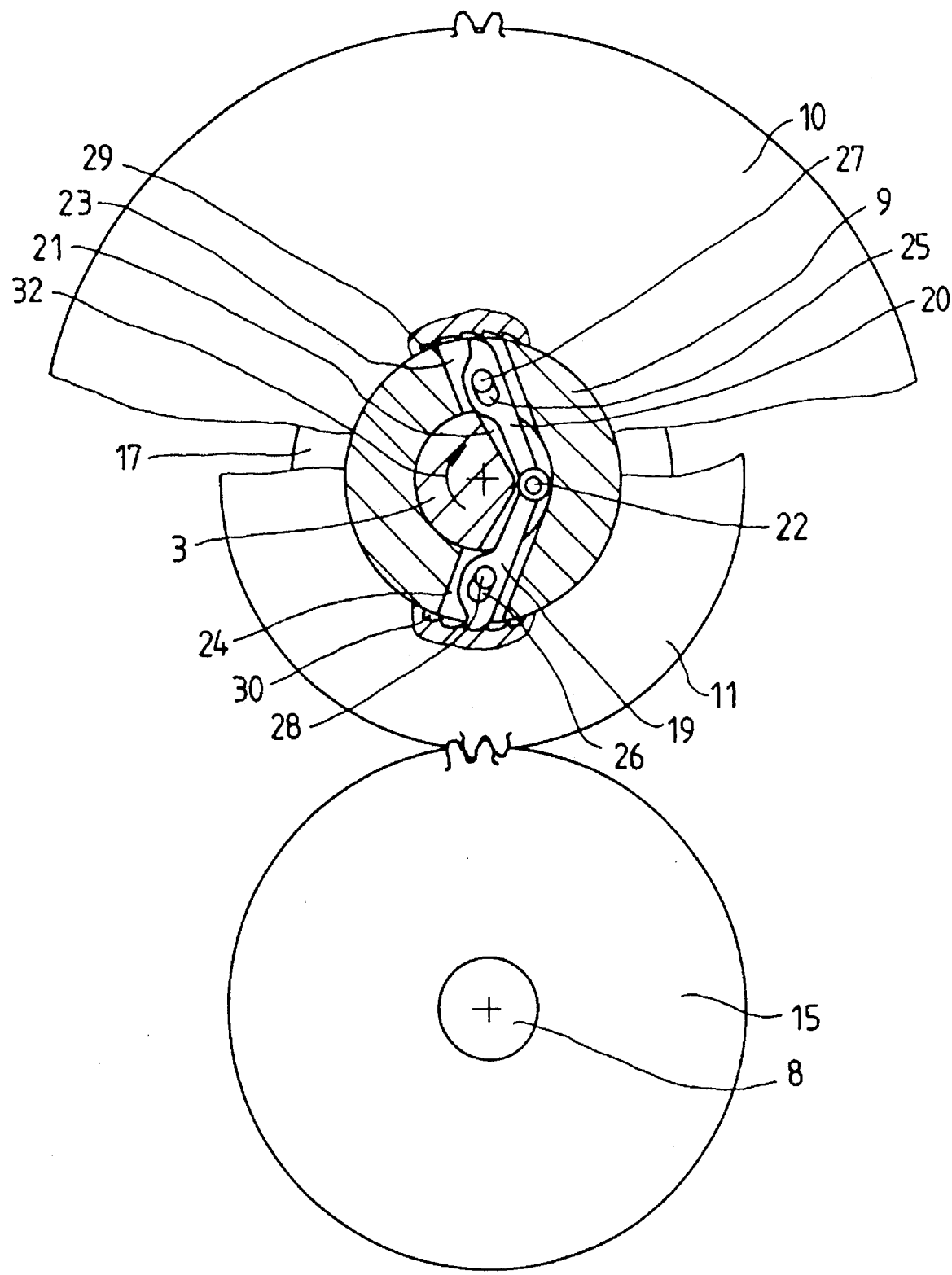
FIG. 3 is a view like that of FIG. 2 showing the operation of the shifting device in the opposite direction of rotation.

Referring now to the drawings and, first, particularly to FIG. 1 thereof, there is shown therein a turning gear transmission installed between two walls 1 and 2. An input or drive shaft 3, which may be connected to an otherwise non-illustrated manually operated crank or to a motor, is accommodated in plain bearings 4 and 5 in the walls 1 and 2. Held in further plain bearings 6 and 7 is an output or driven shaft 8, which is disposed parallel to the input shaft 3. A pawl holder 9 is rotatably mounted on the input shaft 3. Mounted on the pawl holder 9 are two gearwheels 10 and 11, which are secured against axial displacement by two discs 12 and 13. The gearwheels 10 and 11 are in continuous engagement with gearwheels 14 and 15 which are firmly connected to the output shaft 8. Looped around a shoulder 16 of the pawl holder 9 is a spring 17 having ends which are held in the wall 2 by means of a bolt 18. Disposed eccentrically to the input shaft 3 and to the pawl holder 9 are two pairs of pawls 19 and 20, only one pair of which is visible in FIG. 1. The pawls 19 and 20 are respectively mounted on a pin 22 in a recess 21 (FIGS. 2 and 3) of the input shaft 3 so as to be swivellable about an axis disposed parallel to the axis of the input shaft 3. The pawls 19 and 20 are displaceably retained in recesses 23 and 24 of the pawl holder 9 by means of oblong holes or slots 25 and 26 machined in the pawls 19 and 20 and by means of pins 27 and 28 inserted into the pawl holder 9 and extending parallel to the axis of the pawl holder 9. The pawls 19 and 20, at the ends thereof facing away from the respective pins 22, are formed such that they are able to engage internal teeth 29 and 30 of the gearwheels 10 and 11 form-lockingly or positively. In this regard, it is noted that a form-locking connection is one which connects two elements together due to the shape of the elements themselves, as opposed to a force-locking connection, which locks the elements together by force external to the elements.

The operating principles of the shifting device are explained hereinbelow:

When the input shaft 3 is rotated in the direction of the arrow 31 (FIG. 2), the input shaft 3 is rotated in relation to the pawl holder 9, because the pawl holder 9 is restrained from rotating on the input shaft 3 by the friction of the spring 17. Due to the fact that the pawls 19 and 20 are eccentrically mounted on the pin 22, the pawl 20 is guided in the oblong hole or slot 25 by the pin 27 and is moved outwardly over the diameter of the pawl holder 9 towards the internal teeth 29 until the tip of the pawl 20 engages the internal teeth 29 of the gearwheel 10. The other pawl 19 of the pair of pawls is simultaneously retracted below the diameter of the pawl holder 9. After the tip of the pawl 20 comes into contact with the internal teeth 29, the pawl holder 9 does not perform any further relative rotation with respect to the input shaft 3. The input shaft 3 is connected directly to the gearwheel 10 through the intermediary of the pawl 20. As the input shaft 3 rotates farther in the direction of the arrow 31, the pawl holder 9, the pawls 19 and 20 and the gearwheels 10, 11, 14 and 15 are rotated together with the input shaft 3. Due to the different diameters of the gearwheels 10 and 14, the gear transmission unit operates with a transmission ratio of 1:6. The gearwheel 11 rotates six times faster than the gearwheel 10, the gearwheel 11 being able to rotate freely, because the pawl 19 is retracted into the pawl holder 9.

In the opposite direction of rotation in the direction of the arrow 32 (FIG. 3), the pawl 19 moves out over the diameter of the pawl holder 9. The pawl 19 engages the internal teeth 30 of the gearwheel 11. In accordance with the ratios of the diameters of the gearwheels 10, 11, 14 and 15, the gear transmission unit operates with a transmission ratio 1:1, the gearwheels 10 and 11 rotating in a direction opposite to the direction of rotation of the gearwheel 14 and 15. In this case, the pawl 20 is retracted, so that the gearwheel 10 is able to rotate freely on the diameter of the pawl holder 9.

The foregoing is a description corresponding in substance to German Application P 43 23 111.4, dated Jul. 10, 1993, the International priority of which is being claimed for the instant application, and which is hereby made part of this application. Any material discrepancies between the foregoing specification and the aforementioned corresponding German application are to be resolved in favor of the latter.

I claim:

1. Shifting device for a turning gear transmission having an automatic change of transmission ratio when a change in direction of a driving shaft occurs, including two driving gearwheels disposed coaxially with respect to the driving shaft, the driving gearwheels being of different diameters and, respectively, being disconnectable from the driving shaft, and a driven shaft having two driven gearwheels firmly connected thereto and being in continuous pair-wise engagement with the driving gearwheels, comprising a pawl holder rotatably mounted on the driving shaft, the driving gearwheels being rotatably mounted on said pawl holder, at least one pair of pawls held by said pawl holder, and means for causing said pair of pawls, contingent upon the respective direction of rotation of the driving shaft, to effect an entrainment of one of the driving gearwheels in a different direction of rotation, wherein said pawl holder is connected to a two way-acting friction-type restraining mechanism, and said friction-type restraining mechanism comprises a locally anchored spring, said spring being tautly laid in a partial region about an outside diameter of a shoulder formed on said pawl holder.

2. Shifting device according to claim 1, wherein said driving gearwheels have internal teeth forming, together with at least one of said pawls, a one way-acting, form-locking driving clutch.

3. Shifting device for a turning gear transmission having an automatic change of transmission ratio when a change in direction of a driving shaft occurs, including two driving gearwheels disposed coaxially with respect to the driving shaft, the driving gearwheels being of different diameters and, respectively, being disconnectable from the driving shaft, and a driven shaft having two driven gearwheels firmly connected thereto and being in continuous pair-wise engagement with the driving gearwheels, comprising a pawl holder rotatably mounted on the driving shaft, the driving gearwheels being rotatably mounted on said pawl holder, at least one pair of pawls held by said pawl holder, and means for causing said pair of pawls, contingent upon the respective direction of rotation of the driving shaft, to effect an entrainment of one of the driving gearwheels in a different direction of rotation, including four of said pawls swivellable pair-wise about a common axis disposed parallel to the rotational axis of the driving shaft, said pawls, respectively, being situated in recesses formed in said pawl holder and being displaceable therein with a radial component, wherein said common axis is on a swivel pin fixed in a recess formed in the driving shaft.

* * * * *